Figure 1:
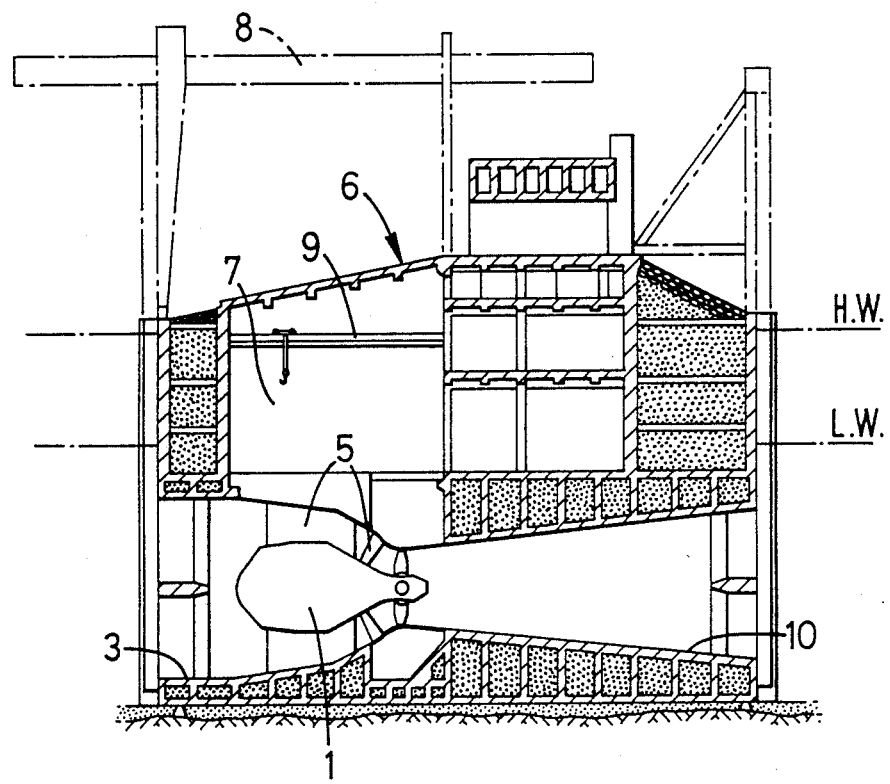

United States Patent [19]

Horne et al.

[11] Patent Number: 4,940,387
[45] Date of Patent: Jul. 10, 1990

[54] WATER TURBINE ARRANGEMENT FOR POWER GENERATION

[76] Inventors: Colin Horne, 2 Dene Cottage, Milley Rd, Waltham St. Lawrence, Reading, England; Edward B. Morgan, 20 Manor Close, Shrivenham, Swindon Wiltshire, United Kingdom

[21] Appl. No.: 347,405

[22] Filed: May 4, 1989

[30] Foreign Application Priority Data

May 11, 1988 [GB] United Kingdom ............. 8811159

[51] Int. Cl.⁵ .................. F01D 15/10; F04D 29/60
[52] U.S. Cl. .................................... 415/221; 415/214.1
[58] Field of Search ............... 415/214.1, 220, 221, 415/207; 285/261

[56] References Cited

U.S. PATENT DOCUMENTS

| | | | |
|---|---|---|---|
| 2,634,375 | 4/1953 | Guimbal | 415/221 |
| 2,764,266 | 4/1956 | Haworth | 415/214.1 |
| 2,986,095 | 5/1961 | Namur | 415/214.1 |
| 3,535,540 | 10/1970 | Boulogne | 415/221 |
| 4,102,599 | 7/1978 | Ziegler | 415/221 |
| 4,515,071 | 5/1985 | Zach | 415/220 |
| 4,515,524 | 5/1985 | Fisher | 415/221 |
| 4,697,984 | 10/1987 | Takeuchi et al. | 415/221 |
| 4,708,590 | 11/1987 | Bronowski et al. | 415/221 |
| 4,715,781 | 12/1987 | Bronowski et al. | 415/221 |

FOREIGN PATENT DOCUMENTS 425888 3/1935 United Kingdom .
810405 3/1959 United Kingdom .
1265151 3/1972 United Kingdom .
1571766 7/1980 United Kingdom .

Primary Examiner—Robert E. Garrett
Assistant Examiner—Hoang Nguyen

[57] ABSTRACT

The arrangement is of the kind in which at least one water turbine (11) is located in the path of a water source for power generation, comprising a barrage structure (10) which extends across and above the level of the water source (12). The invention is characterized in that the structure is of a cross-sectional width sufficient to absorb static and dynamic loading from said water source and defines only a draught tube (15) for the turbine, in that the turbine is mounted within an inlet casing (19) to form a separate assembly, in that the outlet end of said inlet casing is adapted to be releasably connected to the inlet end of said draught tube, in that locating and locking means (24, 25) are provided for effecting said releasable connection, and in that means (20 to 22) are provided for supporting the weight of the turbine/inlet casing assembly when connected to the draught tube. Preferably, the support means for the turbine comprises a support pier (20) extending upwardly from the wall of the inlet casing to beneath the turbine, and this assembly is, in turn, supported by further support means, comprising a foundation pad (21) mounted on (22) whereby the turbine in use will transmit static and dynamic loading to said piling via said support structure.

4 Claims, 2 Drawing Sheets

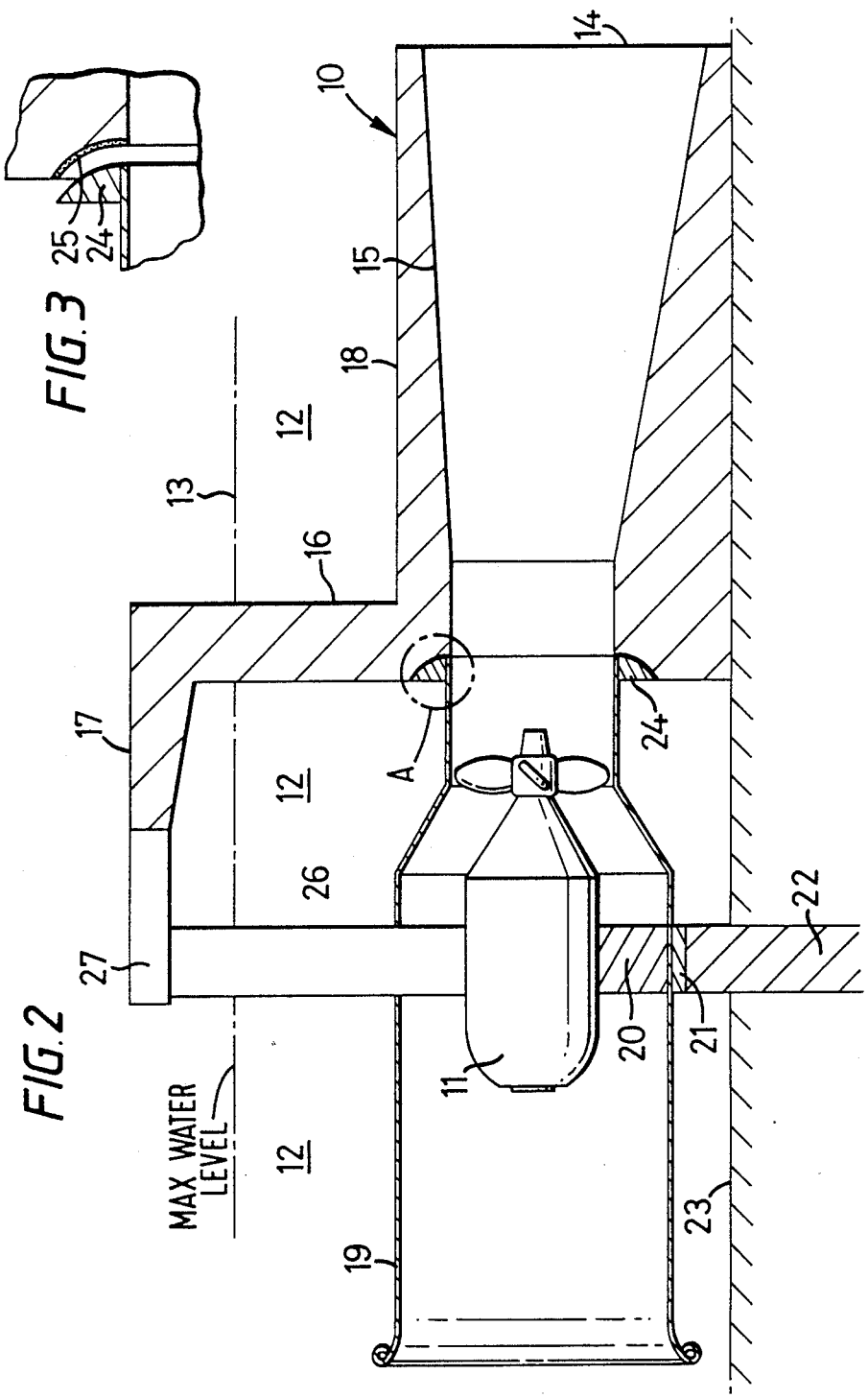

WATER TURBINE ARRANGEMENT FOR POWER GENERATION

This invention relates to a water turbine arrangement for power generation, and in particular to the manner in which the turbine is located in the path of the water source, which may be tidal.

A conventional arrangement for tidal power generation, such as proposed for the River Severn, is shown in FIG. 1 of the accompanying drawings. In this arrangement each power generating means comprise a bulb turbine 1 incorporating a power generator, which is centrally mounted, via struts 5, within a tubular inlet 3 forming an integral part of a caisson 6. The caisson is intended to form part of a barrage which extends completely across the water source, and is of a height required to extend above high water, typically 35.00 m. The cross-sectional width of the caisson 6 is very substantial since, in addition to being stable against dynamic and static water forces, it needs to provide a gallery 7 over the turbine so that heavy and lighter lifting gear can, (via gantries 8 and 9 respectively), traverse the length of the turbine 1, (which is of the order of 20.00 m), for repair and servicing, and to define a draught tube 10 for the turbine, which is of the order of 30.00 m. in length. A typical overall width dimension for the caisson is 55.00 m.

It will be appreciated that the construction cost for such a massive structure will be very substantial. Also, due to the manner in which the turbine 1 is mounted within the caisson 6, any repair or major refit to the turbine would normally be carried out on site, or, where this was not possible, the heavy lifting gear would be used for the removal of the turbine for transport to the shore.

An object of the invention is to provide an alternative arrangement for locating the turbine, which has a number of advantages compared with the conventional arrangement described above.

According to the invention, an arrangement for locating a water turbine in the path of a water source for power generation comprises a structure, such as a barrage, which extends across and above the level of the water source, wherein the structure is of a cross-sectional width sufficient to absorb static and dynamic loading from said water source and to define only a draught tube for the turbine, the turbine is mounted within an inlet casing to form a separate assembly, the outlet end of said inlet casing is adapted to be releasably connected to the inlet end of said draught tube, locating and locking means are provided for effecting said releasable connection, and means are provided for supporting the weight of the turbine/inlet casing assembly when connected to the draught tube.

Preferably, the turbine is mainly supported from underneath by a support structure extending to the wall of the inlet casing, and the assembly is, in turn, supported on piling, such that the turbine will transmit static and dynamic loading to said piling via said support structure.

Alternatively, the structure defining the draught tube may be provided with a suitable harness or platform upon which the assembly is supported.

It will be appreciated that by supporting the turbine mainly in compression, via piling, or other suitable support, the inlet casing around the turbine needs only to support its own weight, thereby reducing the overall weight of the assembly.

It will be appreciated that, compared with the conventional tidal power arrangement described above, an arrangement in accordance with the invention has a number of significant advantages including (1) the width of the caisson or other structure associated with the turbine can be of much reduced width.

(2) the water at the depth where the assembly is to be located, e.g. of the order of 20 m., can be utilised to float the turbine assembly into and out of connection with its draught tube. Hence, a faulty assembly can be readily removed and replaced with a new assembly.

(3) the faulty unit can be returned to land for repair or maintenance under controlled conditions.

(4) since the replacement time would compared with a repair or refit, there would be less time out of service, and (5) since no major repair or refit would be carried out on site, no heavy lifting gear would be required on the structure.

In order that the invention may be readily understood, one embodiment in accordance therewith will now be disclosed with reference to the accompanying drawings, in which FIG. 1 is a cross-section of the proposed conventional arrangement discussed above, and FIG. 2 is a cross-section of said embodiment, and FIG. 3 is a detail "A" of FIG. 2.

Referring to FIG. 2, in accordance with the invention, a caisson 10 for supporting a bulb turbine 11 is provided as part of barrage which extends across a tidal water source 12 and to a height above the maximum water level 13 of said source. The lower part 14 of the caisson is of a width sufficient to define a draught tube (shown dotted) 15, e.g of the order of 30.00 m as for the conventional arrangement discussed above, whereas the upper part 16 of the caisson, where the dynamic and static forces produced by the water source 12 would allow, is of considerably reduced thickness, e.g of the order of 1.0 m, and its upper end, which projects above maximum water level, is extended towards the turbine side of the caisson to provide an access platform 17. Conveniently, the caisson 10 would be constructed, in situ, from reinforced concrete, although it may, as known per se, be constructed as a framework which is floated to site and sunk into position using ballast.

For a typical arrangement using a bulb turbine 11 of around 10 MW output in a tidal source with a tidal range of the order of 8.00 m and a maximum water level of the order of 20.00 m, a width of 30.00 m as suggested above for the lower part 14 of caisson and a height of 13.00 m would be more than sufficient to withstand the expected static and dynamic forces in most applications.

The bulb turbine 11 is mounted centrally within a separate inlet casing 19 mainly from beneath via a support pier 20, although one or more radially extending relatively lightweight support struts (not shown) may be provided to centre the turbine. This turbine and inlet casing assembly, in turn, is mounted on a foundation pad 21 provided at the upper end of a piling 22 extending into the sea bed 23. Alternatively, the pier 20 could be supported via a suitable yoke from the caisson wall. In either case it will be appreciated that, in use, the static and dynamic forces produced by the turbine are transmitted, mainly in compression, via the pier 20 and its foundation.

As a result of this mounting arrangement, the inlet casing 19 can be of relatively lightweight construction, since it need only support its own weight.

The outlet end of the inlet casing (see FIG. 3) is provided around its mouth with an annular radiussed, or coned, spigot 24 designed to fit against a co-operating bearing surface 25 formed around the inlet end of the draught tube 15.

As shown in FIG. 2, an access shaft 26 is provided for routine maintenance and servicing, which extends vertically from a top opening in the casing of the turbine 11 through the wall of the inlet casing 19 and is provided at its upper end with a platform 27 adapted to align with the platform 17 of the caisson 10.

As discussed above, apart from the advantage that the caisson can be of much reduced width compared with the conventional arrangement discussed, a further significant advantage is that the turbine and inlet casing assembly can, via a suitable locking mechanism shown diagrammatically at 28, be readily removed and replaced by floating the assembly into and out of position, the co-operating spigot 24 of the inlet casing 19 and bearing face 25 of the draught tube 15 facilitating connection of the assembly to the draught tube, whilst allowing a small articulation between the two.

Thus, in view of the relatively simple operation to remove and replace a turbine assembly, major refits or repairs can be carried out on shore and, therefore, heavy lifting gear would not be required at the barrage.

We claim:

1. A water turbine arrangement in which at least one water turbine is located in the path of a water source for power generation, comprising a barrage structure which extends across and above the level of the water source, and in which the barrage structure is of a cross-sectional width sufficient to absorb static and dynamic loading from said water source and defines only a draught tube for the turbine, characterized in that the turbine is mounted centrally within an annular inlet casing to form a separate turbine assembly, in that the turbine assembly has a support structure extending between an exterior surface of the turbine and an interior surface of the inlet casing and is mounted on further support means comprising a foundation member whereby the turbine assembly, in use, will transmit static and dynamic loading to the bed of the water source via said support structure, in that an outlet end of the inlet casing is provided, around its opening, with an annular radiussed or coned spigot designed to be fitted against a co-operating bearing surface formed around an inlet end of the draught tube to provide an articulate, releasable connection, and in that locking means are provided for effecting said releasable connection.

2. An arrangement according to claim 1, and in which said barrage structure comprises a caisson for supporting said turbine, the lower part of which is of a width sufficient to define said draught tube, and the upper part of which is of considerably reduced width, but sufficient to withstand expected dynamic and static forces, wherein an upper end of said upper part projects above the maximum water level of said water source and extends toward the turbine side of the caisson to provide an access platform.

3. An arrangement according to claim 2, characterized in that an access shaft is provided for routine maintenance and servicing, which extends vertically from a top opening in a casing of the turbine through a wall of the inlet casing and is provided at its upper end with a platform adapted to align with said access platform.

4. A water turbine arrangement in which at least one water turbine is located in the path of a water source for power generation, comprising a barrage structure which extends across and above the level of the water source, and in which the barrage structure is of a cross-sectional width sufficient to absorb static and dynamic loading from said water source and defines a draught tube for the turbine, characterized in that the turbine is mounted centrally within an annular inlet casing to form a separate turbine assembly, the turbine assembly has a support structure extending between an exterior surface of the turbine and an interior surface of the inlet casing and is mounted on further support means, independent from said barrage structure, supported directly by the bed of the water source whereby the turbine assembly, in use, will transmit static and dynamic loading to the bed of the water source via said further support means, an outlet end of the inlet casing is provided around its periphery with an annular radiussed or coned spigot designed to be fitted against a co-operating bearing surface formed around an inlet end of the draught tube to provide an articulate, releasable connection, and locking means are provided for effecting said releasable connection.

* * * * *